Patented Sept. 29, 1942

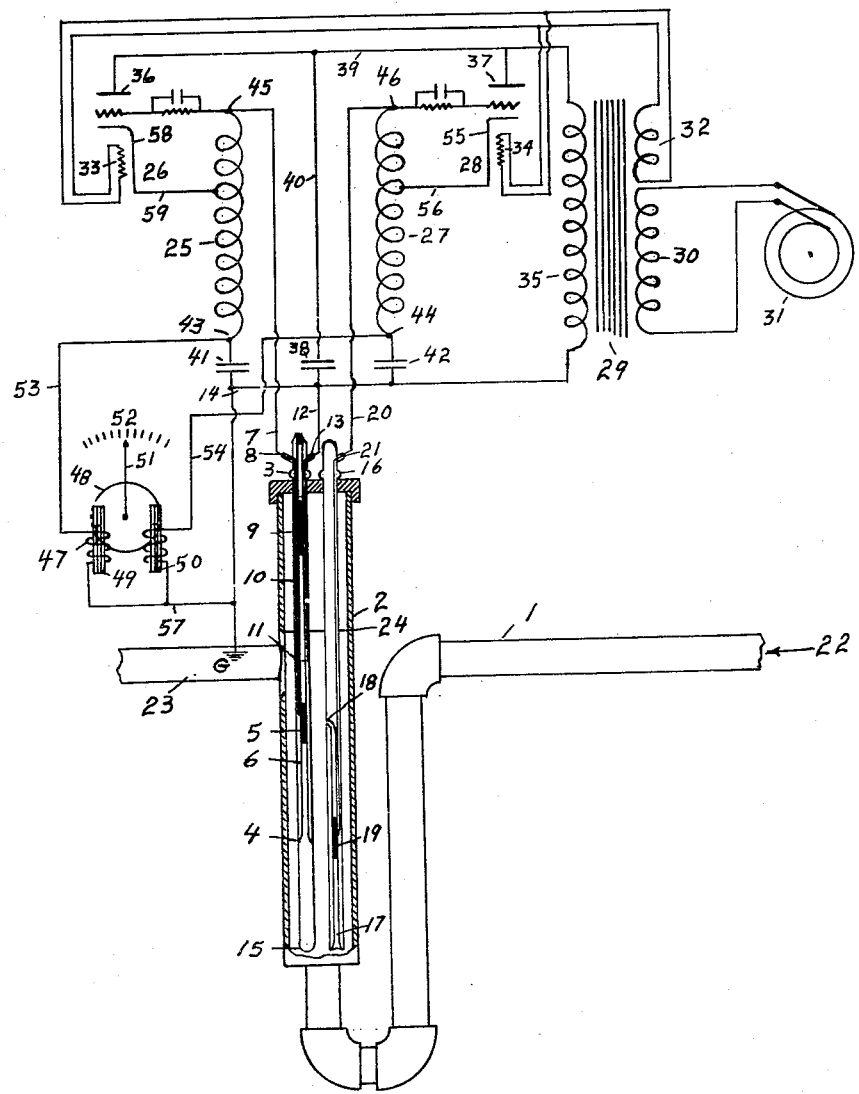

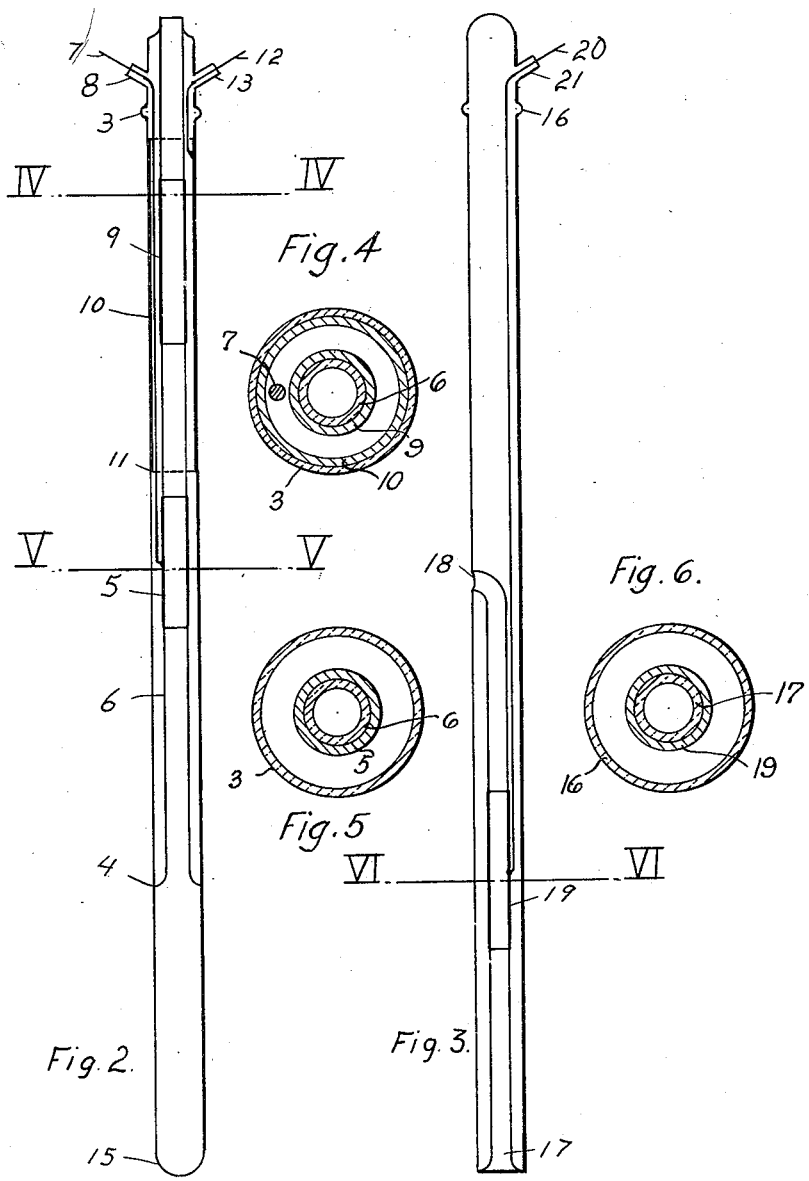

2,296,867

UNITED STATES PATENT OFFICE 2,296,867

APPARATUS FOR CONTROLLING THE PROPORTIONATE ADMIXTURE OF INGREDIENTS WITH LIQUIDS

Ralph Willoughby Osborne, Toronto, Ontario, Canada

Application August 12, 1939, Serial No. 289,924

20 Claims. (Cl. 175—183)

In processing liquid mixtures it is desirable to maintain definite standards of purity or proportioning of ingredients by some means of continuous control associated with the process. As many liquid mixtures or pure liquid mixtures or pure liquids are conductors of electricity and as a change in the proportioning of ingredients in liquid mixtures or deviation from purity of pure liquids affects a change in conductivity, control by electrical means appears the most convenient. To effect control by purely electrical means it is necessary to cause electricity to flow through the liquid by some means of admittance thereto. If electrodes are immersed in the liquid and electricity is passed between the electrodes continuously, decomposition of the said electrodes takes place more or less rapidly depending on the type of liquid. It is therefore very desirable to devise a means admitting electricity to the liquid without having electrodes in contact therewith. Most liquids that are electrical conductors have large temperature coefficients which makes it necessary to compensate for change in conductivity due to change in temperature so that errors in the control of the desired qualities of the liquid will be avoided. Some liquids have small changes in conductivity with a given change in qualities under control requiring extreme sensitivity of control apparatus in which case it has been found that thermal expansion may be cause of error in some types of apparatus, also condensation of conducting liquids on exposed surfaces of certain parts of control apparatus may cause leakage of current thus introducing error in the control of desired qualities of the liquid in process.

The object of my invention is to provide apparatus for controlling the proportionate admixture of an ingredient with a liquid in which a change in the proportioning of ingredients in liquid mixtures or the presence of impurities in otherwise pure liquids is accompanied by a change in electrical conductivity of such liquids, by electrical means employing high-frequency alternating current admitted to a column of liquid within a dielectric tube by condenser means applied to the outside surface of the said dielectric tube thus obviating the difficulties arising in systems employing electrodes in contact with the liquid as hereinbefore mentioned.

Another object of my invention is to provide means for compensating for changes in conductivity of liquid in process due to changes in temperature.

Another object of my invention is to provide means for preventing errors in the measurement of the conductivity of liquids because of apparent change in conductivity due to thermal expansion.

Another object of my invention is to provide means preventing leakage of current over essential apparatus due to condensation of vapors of conducting liquids on exposed surfaces.

A further object of my invention is to provide an oscillator for generating high-frequency electricity for actuating apparatus for controlling the proportionate admixture of an ingredient with a liquid, in which the essential condenser unit comprises a liquid mixture within a dielectric tube with condenser means applied to the outer surface of the said tube and in which the major part of the factor Q of the oscillator circuit which equals the reactance of $1/\omega C$ of the condenser means divided by the resistance R of the column of liquid within the said dielectric tube arises from the resistance being variable, the factor Q is likewise variable resulting in a variable current from the source energizing the oscillator and as the current from the source is either direct current or commercial alternating current, the variation therein is readily measurable.

In the drawings, which illustrate one embodiment of my invention as used particularly for indicating the strength of sulfuric acid during the process of manufacture, Figure 1 is a diagrammatic view showing conductivity cells constructed in accordance with my invention, and a form of high-frequency oscillator circuit in which they may be connected;

Figure 2 shows diagrammatically the details of the standard conductivity cell of Figure 1;

Figure 3 shows diagrammatically the details of the measuring cell of Figure 1;

Figure 4 is an enlarged cross-sectional view taken along the line IV—IV of Figure 2 showing the relative positions of the various parts of the cell and indicating the materials that may be used for their construction;

Figure 5 is a similar cross-section taken along the line V—V of Figure 2; and

Figure 6 is a similar cross-section taken along the line VI—VI of Figure 3.

To fully understand my invention and the attainment of the various objects set forth reference may be had to the accompanying drawings which as above stated illustrate one adaptation of my invention as used for indicating the strength of sulphuric acid during the process of manufacture, wherein 1 is a section of pipeline between the chamber where water is mixed with the acid to reduce it to the desired strength and the coolers which absorb the heat resulting therefrom. The said section of pipeline is adapted to the use of my invention for indicating the strength of the acid and comprises the vertical section 2 in which is suspended a glass tube 3 which has a double wall from the top down to 4. A condenser plate 5 is attached to the outer surface of the inner wall 6 and connected with a wire 7 which passes through the outer wall of the tube 3 at 8. A condenser plate or metallic coating 9 covers a section of the outer surface of the inner wall 6 near the top of the tube. A metallic tube 10, most conveniently made of fine wire mesh or screen, contacts the inner surface of the outer wall of the tube 3 from a point opposite the top of the condenser plate 9 down to point 11 and connected by wire 12 which passes through the outer wall of the tube 3 at 13 and which is connected to the ground wire 14. The tube 3 is filled with acid of standard strength which occupies the lower single walled section 15 to 4 and the inner tube formed by the inner wall 6 from 4 up to the condenser plate 9 to a point where expansion due to maximum operating temperature will not carry the upper limit of the acid above the top of condenser plate 9. 16 is another glass tube, which I call a measuring tube, having an inner tube 17 open at the lower end and opening at the upper end through the wall of the tube 16 at 18. A condenser plate 19 covers a midsection of the outer surface of the inner tube 17 and is joined by wire 20 which extends out through the wall of the tube 16 at 21. Acid flows through the pipe section 1 in the direction of the arrow 22, entering the bottom of vertical section 2 and leaving through pipe 23, the level of the acid in the vertical section 2 being maintained at 24. Since the inner tube 17 of the measuring tube 16 is open at both ends, a portion of acid flows through the inner tube 17.

The standard tube 3 with its condenser plate 5 and the measuring tube 16 with its condenser plate 19, structural details of which have been previously described, each forms the condenser unit of a vacuum tube oscillator. To those familiar with the generation of high-frequency current by means of oscillators it is known that essential parts of the oscillator circuit that determine the frequency generated are an inductance coil shunted by a condenser and that the frequency $f$ equals $\frac{1}{2} \pi \sqrt{LC}$ when L is the inductance of the coil in henrys and C is the capacity of the condenser in farads. The factor Q of the circuit equals $\omega L/R$ when R is the resistance of the inductance coil in ohms. The factor Q is generally considered as being dependent entirely on the effective resistance of the inductance coil, the condenser being considered as having negligible resistance. But if there are appreciable losses in the condenser giving rise to an effective resistance or if a resistance is connected in series with the condenser, then a factor Q is applicable to the condenser and equals $1/\omega C/R$. It is seen therefore, that a circuit having low resistance has a high factor Q. In designing the oscillators, which are a part of my invention, I design the inductance coils so that they will have the lowest possible resistance, I then design the standard tube 3 and the measuring tube 16, having due regard for the specific resistivity of the liquid mixture therein, so that they function as condenser units in their respective oscillator circuits. It will be seen that the column of acid within the inner wall 6 of the standard tube 3 between the condenser plate 5 and the point 4 forms the greater part of the effective resistance of the tube as a condenser unit, and is, in fact, the major factor contributing to the low Q of oscillator circuit with which the standard tube 3 is associated. Likewise the measuring tube 16 having a column of acid flowing through its inner tube 17 has the resistance of the acid within the tube in series with the condenser plate 19 but in this case there are in effect two resistances in parallel, one being that part of the column of acid between the condenser plate 19 and the lower end of the tube 17 and the other end being between the condenser plate 19 and the upper end 18 of the tube 17. The tubes are so proportioned that their resistances are substantially equal. Since the energy required to excite the oscillators bears an inverse ratio to the Q factor of the circuits, and since the circuits are so designed that the major part of the resistance of the circuits is due to the standard liquid mixture in the standard tube 3 in one circuit and the liquid mixture flowing through the inner tube 17 of the measuring tube 16 in the other circuit, the Q factor of the oscillator circuits is for the most part governed thereby. Any variation in the Q of either oscillator circuit results in a variation of the energy required to excite the oscillator and since the said energy is drawn from a source of commercial power, such energy is more readily measured than is high frequency current.

Any type of oscillator circuit may be adapted to my invention although I use the Hartley circuit in its simplest form. Referring again to the drawings, 25 is the inductance coil associated with the standard tube 3, 26 is a vacuum tube of the heater type, 27 is the inductance coil associated with tube 16 and 28 is a vacuum tube like 26, 29 is a transformer having primary winding 30 connected to a source of power 31, a low voltage secondary winding 32 connected to heaters 33 and 34 respectively of vacuum tubes 26 and 28 and secondary winding 35 supplying voltage to the anodes 36 and 37 respectively of vacuum tubes 26 and 28, by-pass condenser 38 is connected between anodes 36 and 37 of vacuum tubes 26 and 28 respectively by wires 39 and 40 and ground wire 14 to ground G. By-pass condenser 41 is connected between lower extremity 43 of inductance coil 25 and ground wire 14, by-pass condenser 42 is connected between lower extremity 44 of inductance coil 27 and ground wire 14. Wire 7 extends from condenser plate 5 of standard tube 3 to the upper extremity 45 of inductance coil 25. The inductance and condenser circuit comprises starting from ground G, wire 14, by-pass condenser 41, inductance coil 25, wire 7, condenser plate 5 in standard tube 3, acid column between condenser plate 5 and point 4, condenser formed by acid within the tube 3 between point 4 and lower end 15, and the acid in the vertical pipe section 2 to ground G. Wire 20 extends from condenser plate 19 of measuring tube 16 to upper extremity 46 of inductance coil 27. The inductance and condenser circuit comprises, starting from ground G, wire 14, by-pass condenser 42, inductance coil 27, wire 29, condenser plate 19 in measuring tube 16, acid column within inner tube 17 dividing therein in two parallel paths from condenser plate 19 down to the lower opening of inner tube 17 to the acid in the vertical pipe section 2 and upward from condenser plate 19 to opening 18 to acid within vertical pipe section 2 to ground G.

The indicating instrument 47 may be one of several types to which the circuit may be adapted. I have devised an induction type of instrument 48 having great sensitivity and rugged construction. The instrument has a disc, preferably of aluminum, with periphery slightly eccentric to the shaft. Torque producing elements 49 and 50 tend to turn the disc in opposite directions and when the currents in the two elements are equal, the disc takes a position presenting equal areas to the pole faces of the torque producing elements and the pointer 51 is adjusted to the midpoint of the scale 52. If the currents in the two elements become unequal the disc turns presenting a greater area to the pole face of the weaker element and a lesser area to the pole face of the stronger element thus moving the pointer off the central position of the scale 52. The oscillators receive their excitation from a common source as follows: from the secondary winding 35 of transformer 29 positive pulses of its alternating output current flow through wire 39, anode 37, cathode 55, wire 56 and lower section of inductance coil 27 of the oscillator associated with measuring tube 16, thence through wire 54, torque element 50 of the indicating instrument 47, wire 57, ground wire 14 to secondary winding 35 of transformer 29. Likewise positive pulses from the same source (the secondary winding 35 of transformer 29) flow through wire 39, anode 36, cathode 58, wire 59 and lower section of inductance coil 25 of the oscillator associated with the standard tube 3, thence through wire 53, torque element 49, wire 57 and ground wire 14 to secondary winding 35 of transformer 29.

As hereinbefore stated, standard tube 3 contains a standard liquid mixture and is immersed in the liquid mixture in process close to the measuring tube 16 so that the standard mixture within tube 3 will be maintained at the same temperature as the liquid mixture flowing through the measuring tube 16 and thereby compensation for temperature coefficient of resistance is affected.

Since standard tube 3 and measuring tube 16, as condenser units, in parallel respectively with inductance coils 25 and 27 constitute the tuned circuits of oscillators excited from a common source as previously described, the said tuned circuits are so designed that the resistance of the liquid mixture within the tubes 3 and 16 reduces the Q factor of the said tuned circuits to a low value consistent with stable operation of the oscillators. As the energy required to excite the oscillators bears an inverse ratio to the factor Q of their tuned circuits it becomes apparent that measurement of the energy exciting the oscillators at the source is the most convenient means of measuring or comparing the conductivity of the liquid mixtures within tubes 3 and 16 in terms of percentage, specific gravity or other properties affecting the conductivity.

As hereinbefore described the torque element 49 of the indicating instrument 47 is in series with the anode circuit of the oscillator associated with standard tube 3 and torque element 50 is in series with the anode circuit of the oscillator associated with the measuring tube 16. The conductivity of the liquid mixture within the standard tube 3 is relatively constant, therefore the current in the anode circuit of its associated oscillator and the torque element 49 of the indicating instrument 47 will be relatively constant, but since the strength of the liquid mixture flowing through the measuring tube 16 is subject to more or less variation the current in the anode circuit of its associated oscillator and the torque element 50 of indicating instrument 47 will vary accordingly causing the pointer 51 to indicate the liquid strength on the calibrated scale, 52.

During experimentation with my invention certain inconsistencies in measurement were noted which were traced to several contributory causes. In filling the standard tube 3 with sulphuric acid of standard strength and placing it into service it was noted for several hours after that according to the indicating instrument the acid in process was getting weaker while in fact it was not. This was found to be due to wetting of the tube on the inside surface above the level to which the tube was filled causing a conducting film and resultant stray capacity effects which gradually disappeared as the film ran down. It was further noted that change in temperature caused errors which were traced to thermal expansion of the acid within the standard tube causing the level to which the tube was filled to vary as much as several inches. Another possible source of error was thought to be the accumulation of condensation of moisture or sulphate on the outer surface of the standard tube above the level of the acid in process on the outside. To eliminate these sources of error I had a standard tube made like tube 3 having a metallic covering 9 on the outer surface of the inner wall 6 near the top. The standard acid being put in while cold, it is filled to a level slightly above the lower end of the metallic coating 9. This causes stray capacity emanating from the column of acid above the condenser plate 5 to be substantially constant except for varying accumulation of condensation or sulphate on the outside of the tube as previously stated. To eliminate the effects of these varying accumulations I had the metallic screen shield 10 fitted to the inner surface of the outer wall of the tube and connected to ground by wire 12 thus effecting a constant path to ground for stray current emanating from the column of acid within the tube 3 above the condenser plate 5. Following these improvements substantially consistent results were obtained.

While I have described one embodiment of my invention and exemplified its application to the control of the strength of sulphuric acid during the process of manufacture and have shown only means for indicating the strength as an aid to control, it is readily adaptable to the actuating of apparatus for effecting automatic control of the strength of sulphuric acid or other liquid mixtures whose conductivity varies with strength.

What I claim is:

1. In an apparatus for controlling the proportionate admixture of an ingredient with a liquid, a standard tube comprising a tube of dielectric material having a double wall for an intermediate portion of its length, a closed lower end and an annular enclosure between the inner and outer walls, a liquid mixture of standard proportions within the said standard tube, a condenser plate covering an intermediate portion of the outer surface of the inner wall of the said standard tube, a wire attached to the said condenser plate and extended through the outer wall of the said standard tube and connected to a source of high-frequency alternating current whereby the said high-frequency alternating current is admitted to the said liquid mixture of standard proportions as a medium for measuring the electrical conductivity of the said liquid mixture and means comprising a metallic covering of the outer surface of the said inner wall separate from the said condenser plate and extending above the maximum level of the liquid mixture within the said standard tube to compensate errors in electrical conductivity measurements due to thermal expansion of the said liquid mixture.

2. In an apparatus for controlling the proprtionate admixture of an ingredient with a liquid, a standard tube comprising a tube of dielectric material having a double wall for an intermediate portion of its length, a closed lower end and an annular enclosure between the inner and outer walls, a liquid mixture of standard proportions within the said standard tube, a condenser plate covering an intermediate portion of the outer surface of the inner wall of the said standard tube, a wire attached to the said condenser plate and extended through the outer wall of the said standard tube and connected to a source of high-frequency alternating current whereby the said high-frequency alternating current is admitted to the said liquid mixture of standard proportions as a medium for measuring the electrical conductivity of the said liquid mixture, means comprising a metallic covering of the outer surface of the said inner wall separate from the said condenser plate and extending above the maximum level of the liquid mixture within the said standard tube to compensate errors in electrical conductivity measurements due to thermal expansion of the said liquid mixture and means comprising a metallic covering of the inner surface of the said outer wall from the upper edge of the said condenser plate and extending above the maximum level of the liquid mixture within the said standard tube and a wire extending through the said outer wall and connecting the last mentioned metallic covering to ground to compensate errors in electrical conductivity measurements due to condensation of conducting liquids on the outermost surface of the said standard tube.

3. In an apparatus for controlling the proportionate admixture of an ingredient with a liquid, a vertical pipe section through which a liquid mixture in process flows, a horizontal outlet therein, an extension above the said outlet, a measuring tube comprising an inner tube of dielectric material, a condenser plate covering an intermediate section of the outer surface of the said inner tube, an outer tube enclosing the said inner tube between its open extremities and forming an annular enclosure between the said inner and outer tubes, a wire extending through the wall of the said outer tube and connecting the said condenser plate with a source of high-frequency alternating current, a standard tube comprising a tube of dielectric material having a double wall for an intermediate portion of its length, a closed lower end and an annular enclosure between the inner and outer walls, a liquid mixture of standard proportions within the said standard tube, a condenser plate covering an intermediate portion of the outer surface of the inner wall of the said standard tube, a wire attached to the said condenser plate and extending through the said outer wall to a source of high-frequency alternating current, the said measuring and standard tubes being suspended in the liquid mixture within the said vertical pipe section, and an electrical instrument responsive to a difference in the conductivity of the liquid mixture flowing through the said vertical pipe section and the said measuring tube and the liquid mixture of standard proportions within the said standard tube and relatively connected in the circuits associated with the said source of high-frequency alternating current.

4. In an apparatus for controlling the proportionate admixture of an ingredient with a liquid, a first high-frequency oscillator having a condenser unit comprising a column of liquid mixture of standard proportions within a first dielectric tube and condenser means applied to the outer surface of the said tube, a second oscillator having a condenser unit comprising a column of liquid mixture in process flowing through a second dielectric tube and condenser means applied to the outer surface of the said second dielectric tube, a source of electric current for energization of the said first and second oscillators, and an electrical instrument having a first torque producing element responsive to the energizing current for the first oscillator and a second torque producing element responsive to the energizing current for the second oscillator, the said second torque producing element being designed to oppose the first torque producing element so that the said electrical instrument is responsive to difference in electric current energizing the respective first and second oscillators as a result of difference in conductivity of the said liquid mixtures in the said first and second dielectric tubes.

5. In an apparatus for indicating changes in the conductivity of a liquid, an electric circuit which includes in series a resistance formed by a column of said liquid and a condenser formed by a conductor positioned adjacent the said liquid column but not in direct contact with the liquid, a source of high-frequency alternating current for passage through said circuit, and an electrical instrument responsive primarily to changes in conductivity of the liquid column.

6. In an apparatus for indicating changes in the conductivity of a liquid, an electric circuit which includes in series an inductance, a resistance formed by a column of said liquid and a condenser formed by a conductor positioned adjacent the said liquid column but not in contact with the liquid, means for energizing said circuit to produce therein a high-frequency alternating current, said circuit and energizing means being so designed that variations in energy required for energization are due primarily to changes in conductivity of the liquid column, and an electrical instrument associated with said circuit to indicate variations in the energy required for energization of said circuit.

7. In an apparatus for controlling the concentration of a liquid in response to changes in conductivity of the liquid, an oscillator circuit which includes in series an inductance, a resistance formed by a column of said liquid and a condenser formed by a conductor positioned adjacent the said liquid column but not in contact with the liquid, means for energizing said circuit to produce therein a high-frequency alternating current, and an electrical instrument associated with said circuit responsive primarily to variations in the energy required for said energization due to changes in conductivity of said liquid column.

8. In an apparatus for indicating the conductivity of a liquid in an industrial process, an electric circuit of standard impedance which includes in series an inductance, a resistance formed by a column of standard liquid and a condenser formed by a conductor positioned adjacent to said column of standard liquid but not in contact with the standard liquid, a second electric circuit which includes in series an inductance, a resistance formed by a column of process liquid and a condenser formed by a conductor positioned adjacent to said column of process liquid but not in contact with the process liquid, the column of process liquid and adjacent conductor being so designed that variations in the impedance of the second electric circuit resulting from changes in the conductivity of the process liquid are due primarily to variations in the resistance of the process liquid column, means for energizing each of said circuits to produce therein high-frequency alternating currents, and an electrical instrument associated with said circuits responsive to differential variations in energy required for the energization of said circuits.

9. In an apparatus for controlling the concentration of a liquid in an industrial process in response to changes in conductivity of the liquid, an electric circuit of standard impedance which includes in series an inductance, a resistance formed by a column of standard liquid and a condenser formed by a conductor positioned adjacent to said column of standard liquid but not in contact with the liquid, a second electric circuit which includes in series an inductance, a resistance formed by a column of process liquid and a condenser formed by an electrode positioned adjacent to said column of process liquid but not in contact with the liquid, means for energizing each of said circuits to produce therein high-frequency alternating currents, and an electrical instrument associated with said circuits responsive to differential variations in energy required for the energization of said circuits.

10. In an electrical control device, an electric circuit energized by a source of high-frequency alternating current, said circuit including a column of conducting liquid and electrostatic coupling means, comprising an electrode separated from the liquid by a dielectric medium, for admitting the alternating current to said column of liquid, and an electrical instrument associated with said source of alternating current responsive to variations in the energy required for energization of said circuit due primarily to changes in conductivity of said column of liquid.

11. In an electrical control device, a column of liquid within a tube of dielectric material, a source of high-frequency alternating current, an electrode at the outer surface of said tube of dielectric material for transmitting said high-frequency alternating current to said column of liquid by means of electrostatic coupling through said dielectric material, said column of liquid and said electrostatic coupling forming part of a high-frequency alternating current circuit in which variations in a characteristic of the circuit are due primarily to variations in the conductivity of the column of liquid, and an electrical instrument associated with said alternating current circuit responsive to variations in said characteristic of said circuit.

12. In a device responsive to changes in concentration of a liquid in an industrial process, an inner tube of dielectric material through which a portion of said liquid flows, an electrode covering an intermediate portion of the outer surface of the inner tube, a concentric outer tube enclosing said electrode and sealed to the outer surface of said inner tube to shield said electrode, means forming a high-frequency alternating current circuit with said electrode and said liquid stream whereby current is transmitted by electrostatic coupling from the electrode to the stream of liquid flowing through the inner dielectric tube, and an electrical instrument associated with the source of said current responsive primarily to changes in electrical conductivity of said liquid stream.

13. In a device responsive to changes in concentration of a liquid in an industrial process, a cell enclosing a column of liquid of standard impedance and immersed in a body of liquid in process, said cell comprising an inner tube of dielectric material, an intermediate portion of the outer surface of which is covered by an electrode, said electrode being shielded from contact with the process liquid by a surrounding outer tube sealed to the outer surface of the inner tube, means forming a high-frequency alternating current circuit with said electrode and the liquid in process in which the cell is immersed, whereby current is transmitted by electrostatic coupling from both the electrode and the process liquid to the column of standard liquid within the inner dielectric tube, and an electrical instrument associated with the source of said current responsive primarily to differential changes in conductivity of the standard liquid and the liquid in process.

14. In a device responsive to changes in concentration of a liquid in an industrial process, an open-ended tube of dielectric material immersed in the process liquid so that a portion of the liquid in process flows therethrough, a second closed tube of dielectric material containing a standard liquid, said second tube being immersed in the body of liquid in process, an electrode surrounding an intermediate portion of each of said tubes, shielding means surrounding each of said electrodes to maintain said electrodes out of contact with the process liquid, means forming a high-frequency alternating current circuit with each of said electrodes and the process liquid, whereby current is transmitted by means of electrostatic coupling to the liquid within each of the dielectric tubes, and an electrical instrument associated with the source of said alternating current responsive primarily to differential changes in conductivity of the liquid in each of said tubes.

15. In a device responsive to changes in concentration of a liquid in an industrial process, an open-ended tube of dielectric material immersed in the process liquid so that a portion of the liquid in process flows therethrough, a second closed tube of dielectric material containing a standard liquid, said second tube being immersed in the body of liquid in process, an electrode surrounding an intermediate portion of each of said tubes, shielding means surrounding each of said electrodes to maintain said electrodes out of contact with the process liquid, means forming a high-frequency alternating current circuit with each of said electrodes and the process liquid whereby current is transmitted by means of electrostatic coupling to the liquid within each of the dielectric tubes, an electrical instrument associated with the source of said alternating current responsive primarily to differential changes in conductivity of the liquid in each of said tubes, and means for compensating for changes in conductivity of liquid due to changes in tempterature, thermal expansion and condensation of vapors of conducting liquids on exposed surfaces, so that indicated differential changes in conductivity accurately reflect changes in concentration of process liquid.

16. In a device responsive to changes in concentration of a liquid in an industrial process, a vacuum tube high-frequency oscillator circuit having a load comprising a condenser and resistance in series formed by a column of the process liquid flowing through a tube of dielectric material immersed in a body of the process liquid and an electrode covering an intermediate portion of the outer surface of said tube, said electrode being shielded from contact with the process liquid, a second oscillator circuit having a load comprising a condenser and resistance in series formed by a column of standard liquid in a closed tube of dielectric material immersed in the body of process liquid and an electrode covering an intermediate portion of said tube, said electrode being shielded from contact with the process liquid, a source of electric current for energizing the said oscillator circuits, and an electrical instrument associated with said circuits responsive primarily to differential variations in current energizing the said circuits due to changes in conductivity of the said column of process liquid.

17. In a device for controlling the concentration of a liquid in an industrial process, a vacuum tube high-frequency oscillator circuit having a load comprising a condenser and resistance in series formed by a column of the process liquid flowing through a tube of dielectric material immersed in a body of the process liquid and an electrode covering an intermediate portion of the outer surface of said tube and shielded from contact with the process liquid, a second oscillator circuit having a load comprising a condenser and resistance in series formed by a column of standard liquid in a closed tube of dielectric material immersed in the body of process liquid and an electrode covering an intermediate portion of said tube and shielded from contact with the process liquid, means compensating for changes in conductivity due to changes in temperature, thermal expansion and condensation of vapors of conducting liquids on exposed surfaces, a source of electric current for energizing the said oscillator circuits, and an electrical instrument associated with said circuits responsive primarily to differential changes in current energizing the said circuits due to changes in conductivity of the said column of process liquid.

18. A method for controlling the admixture of components of a liquid in an industrial process in response to changes in conductivity of the liquid which comprises by-passing a portion of said liquid to form a stream of relatively restricted cross-section, flowing said stream closely adjacent to but not in contact with conducting means in a high-frequency alternating current circuit so as to transmit said high-frequency alternating current by electrostatic coupling from said conductor to said stream of liquid and pass said current through said stream of liquid, and detecting changes in conductivity of said liquid indicated by changes in a characteristic of the circuit.

19. In an electrical control device, an electric circuit energized by a source of high-frequency alternating current, said circuit including a flowing stream of liquid of varying conductivity and electrostatic coupling means comprising an electrode separated from the liquid by a dielectric medium, and an electrical instrument associated with the source of current responsive to variations in the energy required for energization of said circuit due primarily to changes in conductivity of the liquid stream.

20. A method for controlling the admixture of water with sulfuric acid in response to changes in conductivity of the mixture to obtain an acid of controlled concentration which comprises by-passing a portion of the acid to which water has been added, to form a flowing stream of relatively restricted cross-section, flowing said stream closely adjacent to but not in contact with conducting means in a high-frequency alternating current circuit so as to transmit said high-frequency alternating current by electrostatic coupling from said conductor to said stream of acid and pass said current through said stream of acid, and detecting changes in conductivity of said acid indicated by changes in a characteristic of the circuit.

RALPH WILLOUGHBY OSBORNE.